(12) United States Patent
Mizuno

(10) Patent No.: US 9,854,122 B2
(45) Date of Patent: Dec. 26, 2017

(54) IMAGE FORMING APPARATUS, DATA MANAGEMENT METHOD, AND STORAGE MEDIUM

(71) Applicant: CANON KABUSHIKI KAISHA, Tokyo (JP)

(72) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/295,376

(22) Filed: Oct. 17, 2016

(65) Prior Publication Data

US 2017/0034388 A1 Feb. 2, 2017

Related U.S. Application Data

(63) Continuation of application No. 14/644,014, filed on Mar. 10, 2015, now Pat. No. 9,509,881.

(30) Foreign Application Priority Data

Mar. 14, 2014 (JP) .................................. 2014-052082

(51) Int. Cl.
| | |
|---|---|
| G06K 15/00 | (2006.01) |
| H04N 1/21 | (2006.01) |
| H04N 1/00 | (2006.01) |
| H04N 1/44 | (2006.01) |
| G06F 3/12 | (2006.01) |

(52) U.S. Cl.
CPC ......... *H04N 1/2179* (2013.01); *H04N 1/0005* (2013.01); *H04N 1/0009* (2013.01); *H04N 1/00037* (2013.01); *H04N 1/00063* (2013.01); *H04N 1/0097* (2013.01); *H04N 1/4406* (2013.01); *H04N 2201/0094* (2013.01); *H04N 2201/214* (2013.01); *H04N 2201/218* (2013.01); *H04N 2201/3276* (2013.01); *H04N 2201/3295* (2013.01); *H04N 2201/3298* (2013.01)

(58) Field of Classification Search
None
See application file for complete search history.

(56) References Cited

U.S. PATENT DOCUMENTS

| | | | |
|---|---|---|---|
| 8,125,664 B2* | 2/2012 | Tomita | H04N 1/00204 358/1.13 |
| 2007/0176946 A1* | 8/2007 | Matoba | G03G 15/502 345/619 |

* cited by examiner

*Primary Examiner* — Dov Popovici
(74) *Attorney, Agent, or Firm* — Canon U.S.A., Inc. IP Division

(57) ABSTRACT

An image forming apparatus includes a state management unit that shifts an authentication state from a non-login state to a login state, a storage unit that stores setting information, and a data management unit that, in a case where a free space of the storage unit is less than a threshold value, deletes the setting information stored in the storage unit at a timing of shifting from the non-login state to the login state and secure a free space greater than or equal to the threshold value in the storage unit.

24 Claims, 13 Drawing Sheets

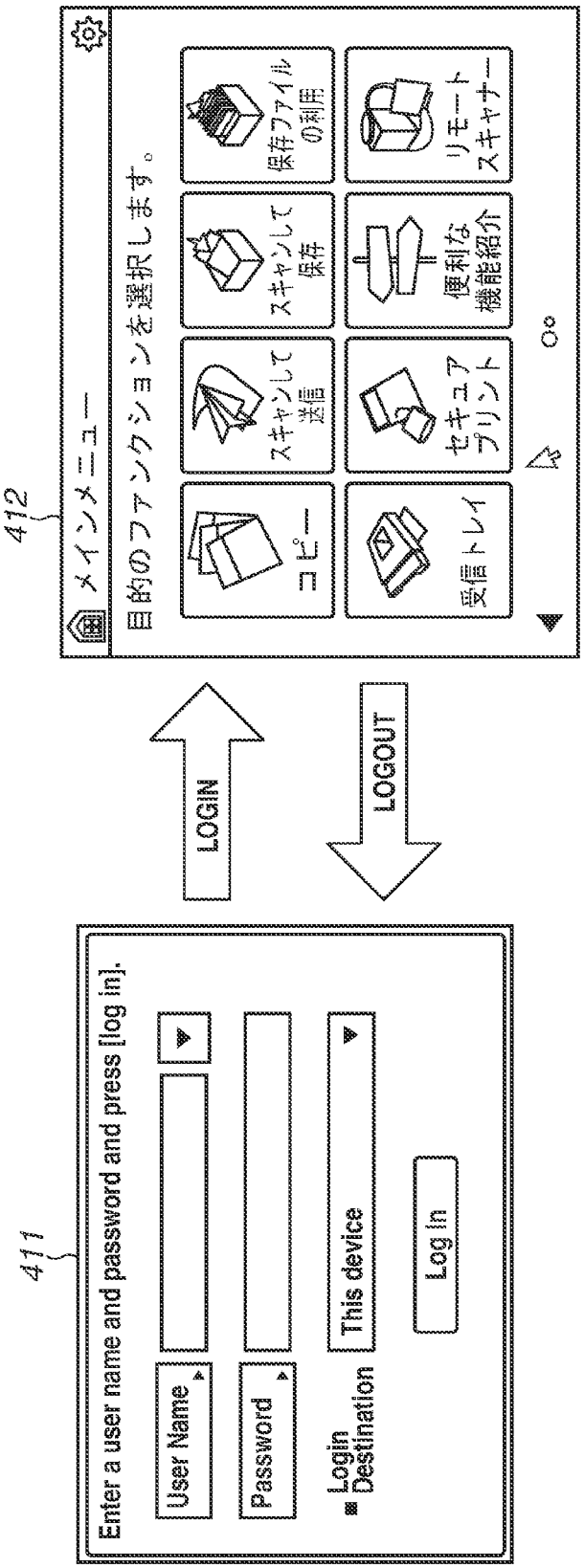

FIG.5A

UPPER LIMIT TABLE  501

| MAXIMUM NUMBER OF PERSONAL USERS | 5 |
|---|---|
| MAXIMUM NUMBER OF GROUP USERS | 3 |
| MAXIMUM DATA SIZE OF SINGLE PERSONAL USER | 1MB |
| MAXIMUM DATA SIZE OF SINGLE GROUP USER | 2MB |
| ENTIRE STORAGE CAPACITY | 10MB |

FIG.5B

PERSONAL MANAGEMENT TABLE  502

| NUMBER OF REGISTERED PERSONAL USERS | | 5 |
|---|---|---|
| USER A | 50KB | 2013/11/7 |
| USER B | 1MB | 2013/10/3 |
| USER C | 130KB | 2013/8/18 |
| USER D | 720KB | 2013/10/24 |
| USER E | 320KB | 2013/11/1 |

FIG.5C

GROUP MANAGEMENT TABLE  503

| NUMBER OF REGISTERED GROUP USERS | | 2 |
|---|---|---|
| GROUP 1 | 470KB | 2013/11/7 |
| GROUP 2 | 800KB | 2013/10/4 |

FIG.5D

DELETION MANAGEMENT TABLE  504

| USED STORAGE CAPACITY | 8MB |
|---|---|
| AUTOMATIC DELETION OF PERSON | ON |
| AUTOMATIC DELETION OF GROUP | ON |

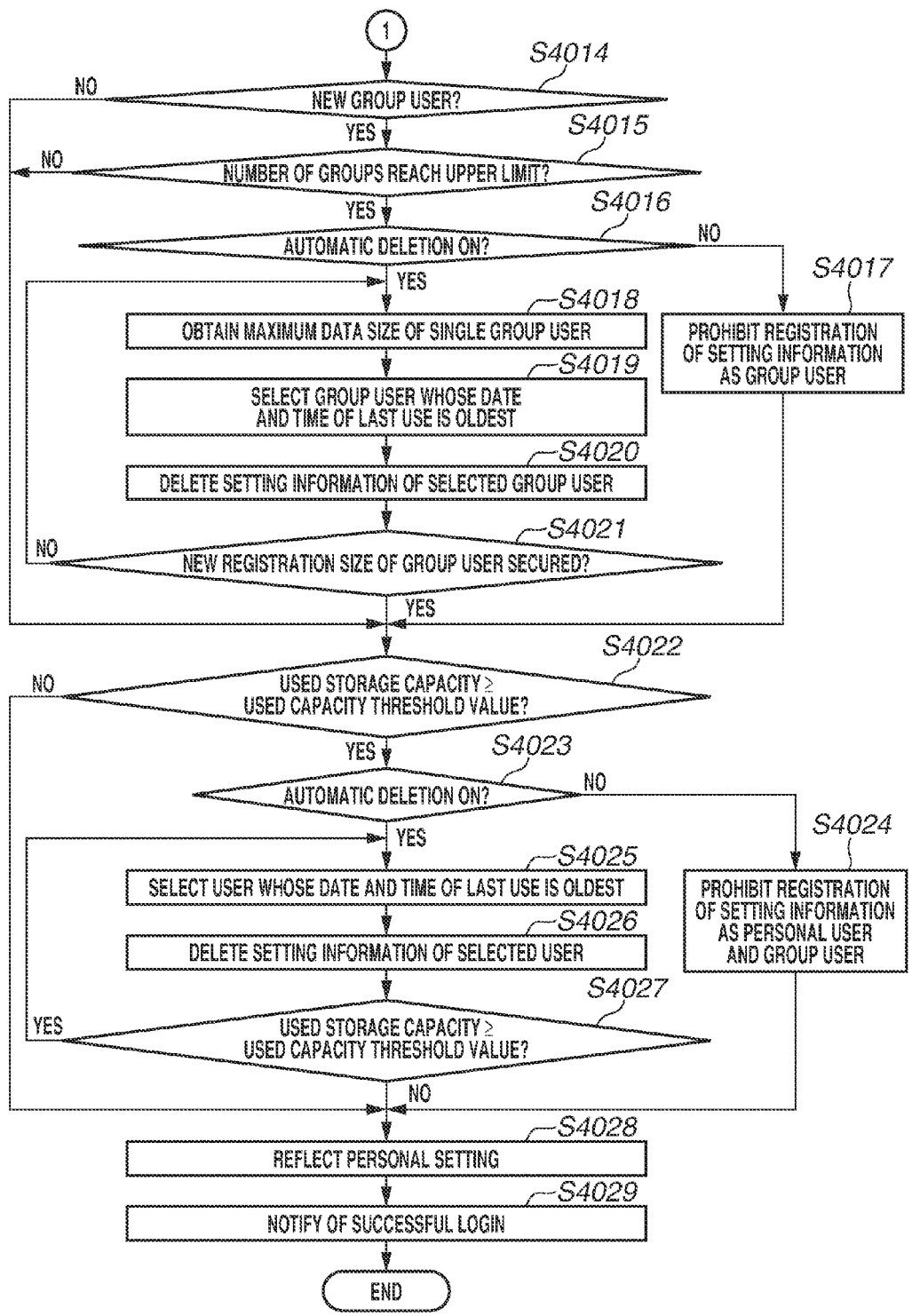

IMAGE FORMING APPARATUS, DATA MANAGEMENT METHOD, AND STORAGE MEDIUM

CROSS REFERENCE TO RELATION APPLICATION

This application is a Continuation of U.S. application Ser. No. 14/644,014, filed Mar. 10, 2015, which claims priority from Japanese Patent Application No. 2014-052082, filed Mar. 14, 2014, which are hereby incorporated by reference herein in their entireties.

BACKGROUND

Field

Aspects of the present invention generally relate to an image forming apparatus, a data management method, and a program.

Description of the Related Art

Recent image forming apparatuses have various functions, and contents of operations performed by a user have been complicated. Generally, the image forming apparatus is often shared by a plurality of users, and an auto-clear function is utilized therein which automatically clears a setting value after elapse of a certain period of time from the setting value has been changed so that a next user does not use the image forming apparatus without noticing the changed setting. In such a utilization form, a user needs to select every time a desired setting screen from an initial menu of the image forming apparatus. Thus, even if users have their individual setting values usually use, they each have to perform the same setting every time and it is bothersome. For example, assume that initial values in job settings of a copy function are "1 in 1" in a layout setting and "no finishing" in a finishing setting. A certain user changes the layout setting to "2 in 1" and the finishing setting to "staple on upper right" to use the copy function.

For another example, in a case of the image forming apparatus of which display language is set to Japanese, a user A who wants to use the apparatus in English as the display language sets a display language setting to English in a user setting. Accordingly, when the user A logs in to the image forming apparatus, the image forming apparatus displays each function in English. As described above, the image forming apparatus can save the settings of each user and provide an environment convenient for each user to use.

When many users use such an image forming apparatus, many personal settings are registered in a single image forming apparatus. However, a storage capacity resource of the image forming apparatus is limited, and it is necessary to delete a user setting value which is no longer used. In order to save a time and effort of an administrator, unnecessary setting values are required to be automatically deleted. As a technique for deleting unnecessary data, Japanese Patent Application Laid-Open No. 10-143910 discusses a technique for deleting removable data when a sufficient storage capacity cannot be secured when data is stored.

However, if data deletion processing is executed to add new setting information during execution of a copy job or the like in the image forming apparatus, performance of job execution is affected by the processing. Further, it is troublesome for an administrator to manually execute the data deletion processing to secure a necessary capacity size.

SUMMARY

Aspects of the present invention are generally directed to a technique for executing data deletion processing to secure a storage capacity for registering setting information without deteriorating performance of other job execution.

According to an aspect of the present invention, an image forming apparatus includes a state management unit configured to shift an authentication state from a non-login state to a login state, a storage unit configured to store setting information, and a data management unit configured to, in a case where a free space of the storage unit is less than a threshold value, delete the setting information stored in the storage unit at a timing of shifting from the non-login state to the login state and secure a free space greater than or equal to the threshold value in the storage unit.

According to aspects of the present invention, data deletion processing can be executed to secure a storage capacity for registering setting information without deteriorating performance of other job execution.

Further features of the present disclosure will become apparent from the following description of exemplary embodiments with reference to the attached drawings.

BRIEF DESCRIPTION OF THE DRAWINGS

FIG. 4 illustrates how display language is set.

FIGS. 5A to 5D are tables of a data configuration of a management table DB.

FIG. 6B is a flowchart illustrating login processing.

DESCRIPTION OF THE EMBODIMENTS

Various exemplary embodiments will be described in detail below with reference to the drawings.

Figure 1:
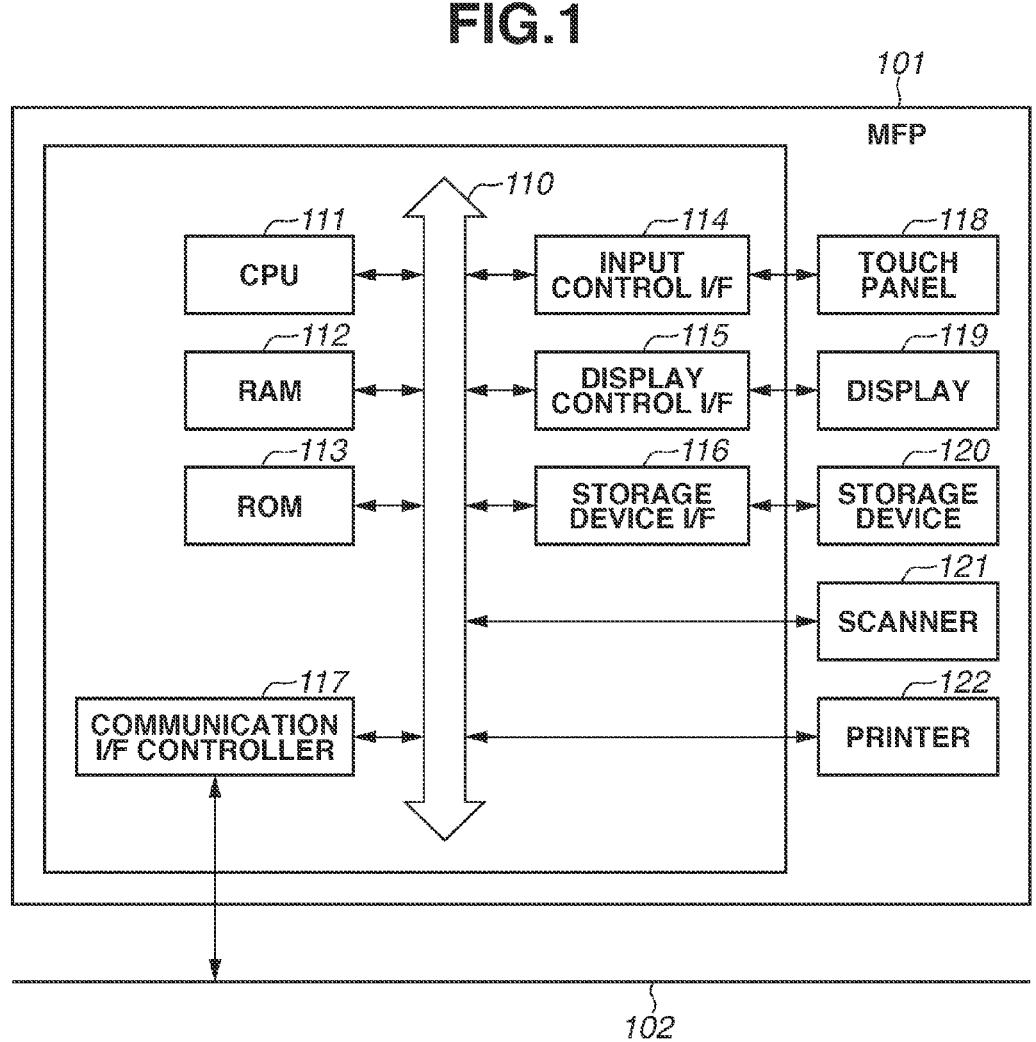
FIG. 1 illustrates an example of a hardware configuration of a multifunction peripheral (MFP).

FIG. 1 illustrates an example of a hardware configuration of a multifunction peripheral (MFP). An MFP 101 is an example of an image forming apparatus. A central processing unit (CPU) 111, a random access memory (RAM) 112, a read-only memory (ROM) 113, an input control interface (I/F) 114, a display control I/F 115, a storage device I/F 116, and a communication I/F controller 117 are connected to a system bus 110. Further, a scanner 121 and a printer 122 are also connected to the system bus 110. Each unit connected to the system bus 110 can exchange data with each other via the system bus 110.

The CPU 111 is a device which controls each device and performs calculation and processing of data. The RAM 112 is a volatile memory and used as a temporary storage area, such as a main memory and a work area, of the CPU 111. The ROM 113 is a non-volatile memory and stores image data, other data pieces, various programs for the CPU 111 to operate, and so on in predetermined areas thereof. For example, the CPU 111 controls each unit in the MFP 101 using the RAM 112 as a work memory according to a program stored in the ROM 113. In this regard, the program for the CPU 111 to operate is not limited to the one stored in the ROM and may be stored in a storage device 120. When the CPU 111 executes processing based on the program, a software configuration of the MFP 101 and processing in flowcharts, which are described below, are realized.

The input control I/F 114 receives a user operation, generates a control signal in response to the operation, and supplies the control signal to the CPU 111. For example, the input control I/F 114 is served as an input device for receiving a user operation and connected to a character information input device, such as a keyboard not illustrated, a hard key for a user to directly input numerical values or the like, a pointing device, such as a touch panel 118, and so on. The touch panel 118 is, for example, an input device which includes an input portion having a planar form and outputs coordinate information corresponding to a touched position on the input portion. According to a first exemplary embodiment, an operation on the touch panel is described below as a user operation. However, a user operation is not limited to an operation on the touch panel. The CPU 111 controls each unit in the MFP 101 according to a program based on a control signal which is generated and supplied from the input control I/F 114 in response to a user operation performed on the input device. Accordingly, the CPU 111 can cause the MFP 101 to operate in response to the user operation.

The display control I/F 115 outputs a display signal to a display 119 to display an image. For example, the CPU 111 supplies the display control I/F 115 with a generated display control signal according to a program. The display control I/F 115 generates a display signal based on the display control signal and outputs the display signal to the display 119. For example, the display control I/F 115 causes the display 119 to display a graphical user interface (GUI) screen forming a GUI based on the display control signal generated by the CPU 111. The touch panel 118 may be integrated into the display 119. For example, the touch panel 118 is formed to have a light transmittance which does not hinder display of the display 119 and mounted on an upper layer of a display surface of the display 119. Input coordinates on the touch panel 118 are associated with display coordinates on the display 119. Accordingly, a GUI can be formed which allows a user to feel like directly operating a screen displayed on the display 119.

The storage device I/F 116 can mount the storage device 120, for example, a hard disk drive (HDD), a flash memory, and a memory card, therein. The storage device I/F 116 read and write data from and to the mounted storage device 120 based on the control by the CPU 111. Depending on the configuration, the CPU 111 can use the storage device 120 in place of the ROM 113. The communication I/F controller 117 performs communication with various wired and wireless networks, such as a local area network (LAN) and the Internet, based on the control by the CPU 111. To a network 102, various apparatuses including a personal computer (PC), other MFPs, a printer, a server, and the like are connected so as to communicate with the MFP 101.

The scanner 121 reads a document and generates image data based on the control by the CPU 111. For example, the CPU 111 causes the scanner 121 to perform scan processing in response to an instruction input by a user via the input control I/F 114. The scanner 121 reads a document placed on a platen or an automatic document feeder (ADF) and converts the read document into digital data to generate image data. The scanner 121 further stores the generated image data into the storage device 120 via the storage device I/F 116. The printer 122 performs print processing of image data stored in the storage device 120 based on the control by the CPU 111. For example, the CPU 111 causes the printer 122 to perform print processing in response to a user's instruction input via the input control I/F 114 and a command instruction input from an external apparatus via the communication I/F controller 117. The printer 122 reads image data from the storage device 120, converts the image data into a printable data format, and print the data to a paper document.

Figure 2:
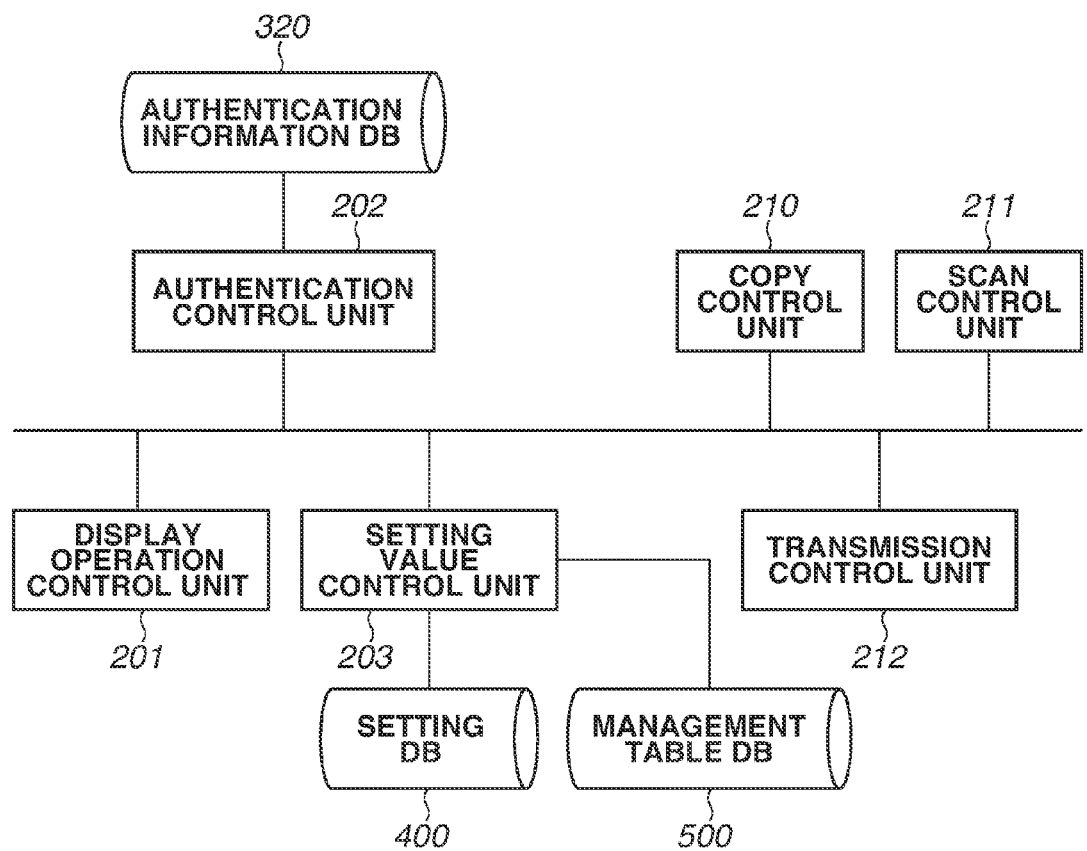
FIG. 2 illustrates an example of a software configuration of an MFP.

The software configuration of the MFP 101 is described with reference to FIG. 2. The software configuration of the MFP 101 illustrated in FIG. 2 is an example for the description of the present exemplary embodiment. Thus, the software configuration of the MFP 101 may include other components in addition to the configuration illustrated in FIG. 2 or have a different configuration which can provide effects similar to those of the present exemplary embodiment. A program corresponding to each control unit in FIG. 2 is stored in the ROM 113, developed in the RAM 112 as necessary at startup or when a function is used, and executed by the CPU 111. Accordingly, each control unit illustrated in FIG. 2 can be realized.

The MFP 101 includes the control units, for example, a display operation control unit 201, an authentication control unit 202, and a setting value control unit 203. The MFP 101 includes one or more functions. The control unit is provided for each of the functions. In FIG. 2, a copy control unit 210, a scan control unit 211, and a transmission control unit 212 are illustrated as an example. Needless to say, the MFP 101 may include functions and control units corresponding to the functions related to processing in the MFP 101 other than the functions shown in FIG. 2.

The display operation control unit 201 controls the input control I/F 114 and the display control I/F 115. For example, the display operation control unit 201 causes the display 119 to display via the display control I/F 115 based on an instruction from the other control unit and obtains information input by a user to the touch panel 118 via the input control I/F 114. The display operation control unit 201 notifies each of the control units of the obtained information.

An authentication information DB 320 is recorded in the storage device 120. The authentication information DB 320 regards an individual person as a registrant, namely a legitimate user of the MFP 101, and stores authentication information of the registrant. The authentication information includes a user name indicating the registrant, a password, and a personal identifier. More specifically, the authentication information DB 320 stores the user name, the password, and the personal identifier by associating them with each other. In addition, each individual person can belong to a group. A group includes a plurality of persons as members. A single person can belong to a plurality of groups. The authentication information DB 320 further stores information indicating a personal user belonging to each group.

The authentication control unit 202 executes authentication processing to determine whether an operator of the MFP 101 is a legitimate user of the MFP 101. More specifically, the operator inputs a personal name and a password. If the input user name and password match a combination of a user name and a password stored in the authentication information DB 320, the authentication control unit 202 determines that the operator is the legitimate user. The authentication control unit 202 starts a session if the operator is the legitimate user. Further, the authentication control unit 202 terminates the session when the operator end the use of the MFP 101. In the following description, an operation that the authentication control unit 202 determines the operator as the legitimate user and starts a session is referred to as login, and an operation that the authentication control unit 202 terminates the session is referred to as logout. Login processing and logout processing are described below. The authentication control unit 202 also controls the authentication information DB 320.

The authentication control unit 202 provides functions of registering and deleting an individual person and updating personal authentication information. The authentication control unit 202 further provides functions of making a certain person to belong a group and withdrawing a certain person from a group.

As another example, the authentication control unit 202 may connect to an external authentication server (not illustrated) via the communication I/F controller 117 and use an authentication result of the authentication server. A conventional technique can be used for exchanging the authentication information with the external authentication server.

A setting DB 400 is recorded in the storage device 120. The setting DB 400 stores shared setting information, personal setting information, and group setting information. The shared setting information is information that an operator can refer to and use in a non-login state. The personal setting information is information that only a personal user as the registrant can refer to and use. The group setting information is information that only a group member belonging to the group can refer to and use. Each of the setting information pieces (the shared setting information, the personal setting information, and the group setting information) includes a setting item and a setting value set to the setting item. In the following description, the shared setting information, the personal setting information, and the group setting information are collectively referred to as setting information accordingly. The setting value control unit 203 registers, changes, and deletes the shared setting information, the personal setting information, and the group setting information in the setting DB 400 in response to a user operation performed on the touch panel 118 based on instruction information obtained from the display operation control unit 201.

A management table DB 500 is recorded in the storage device 120. The management table DB 500 stores information, such as the number of the setting information pieces and a data size which are set to the setting DB 400. The setting value control unit 203 updates the management table DB 500 according to update of the setting DB 400. The setting value control unit 203 further refers to the management table DB 500 and appropriately executes automatic deletion of data (the setting information) registered in the setting DB 400. The automatic deletion is described below.

Figure 3:
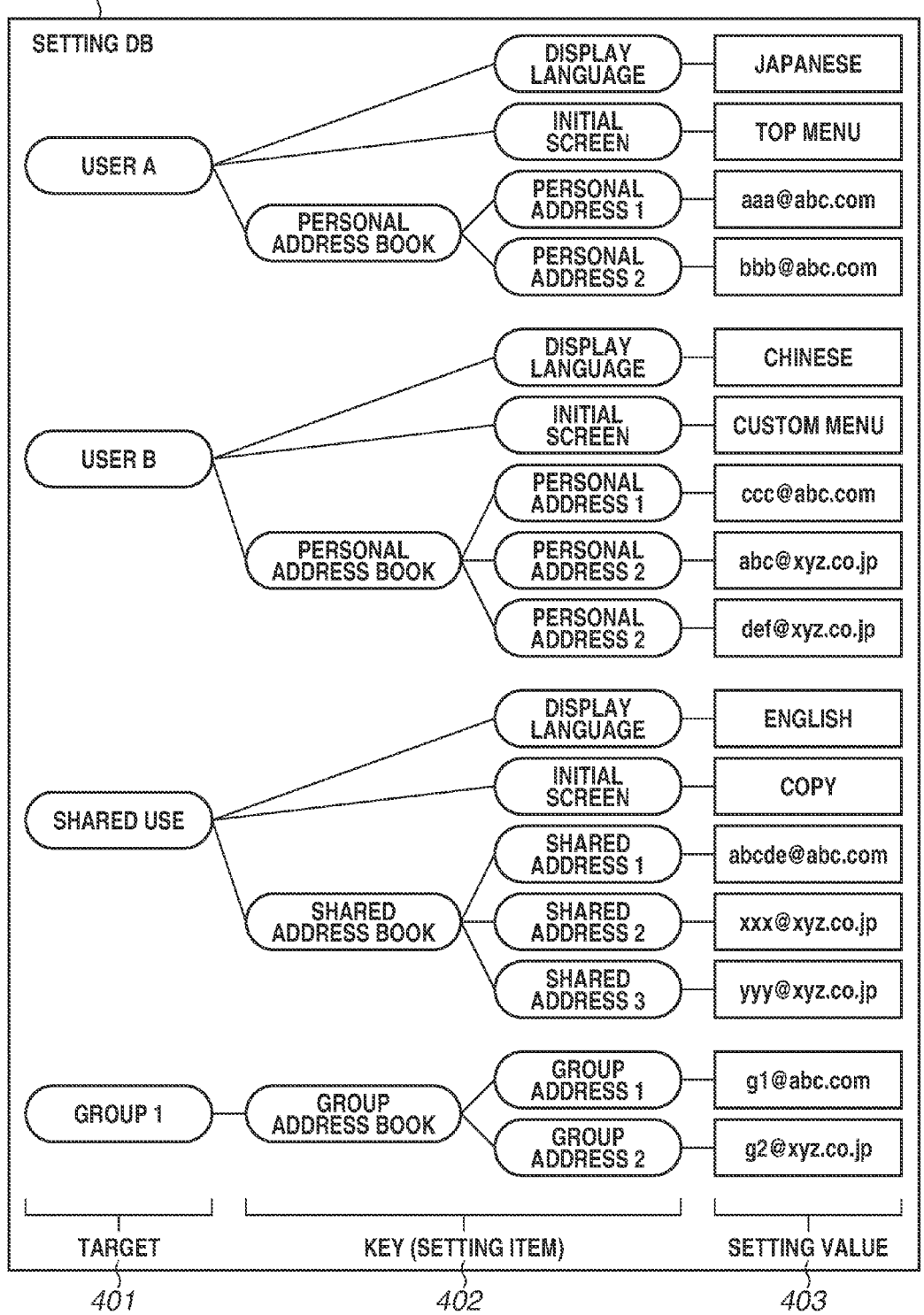
FIG. 3 illustrates an example of a data configuration of a setting database (DB).

FIG. 3 illustrates an example of a data configuration of the setting DB 400. The setting DB 400 stores setting information therein. The setting information includes a key for specifying a setting item and a setting value as a combination. The setting DB 400 is expressed in a hierarchical structure. A first hierarchy includes information of a target 401. The target 401 is a usage target of the setting information and identification information for specifying shared use, an individual person, and a group, and identifying each individual person and each group. For the target 401 as an individual person, a personal identifier is used which indicates that the target is an individual person and identifies each individual person. For the target 401 as a group, a group identifier is used which indicates that the target is a group and identifies each group. In the example illustrated in FIG. 3, it is set that "shared use" as information specifying a shared use, "user A" and "user B" as personal identifiers of respective personal users A and B, and "Group 1" as a group identifier of a group user 1. A corresponding setting value 403 is determined by a combination of the target 401 and a key (setting item) 402.

In the example illustrated in FIG. 3, when the target is the "user A", a setting value corresponding to a key "display language" is "Japanese". When the target is the "user B", a setting value corresponding to a key "display language" is "Chinese". In addition, when the target is the "user B", a setting value corresponding to a key "personal address book—a personal address 1" is "ccc@abc.com". The personal setting information is stored as many as the number of the personal users, whereas the shared setting information is an only setting value in the MFP 101. In the example in FIG. 3, a setting value corresponding to a key "shared use—display language" is "English". When the target is the "Group 1", a setting value corresponding to a key "group address book—group address 1" is "g1@abc.com".

In addition, assume that the personal user A and the personal user B belong to the group user 1, for example. In this case, the personal user A and the personal user B can refer to the group address 1, however a personal user C who does not belong the group user 1 cannot refer to the group address 1.

The setting DB 400 includes some setting information pieces which have the same keys in the personal setting information and the shared setting information and other setting information pieces which do not. When the setting information pieces have the same ley, a setting value (shared setting value) of the shared setting information may sometimes be used as an initial value of a setting value (personal setting value) of the personal setting information if it is not registered. In the example in FIG. 3, personal setting information of a user C is not registered. In this case, "English" which is the shared setting value is applied to the display language of the user C. In the case that the personal setting information and the shared setting information do not have the same key, it is regarded that the personal setting information is not registered or the number of registration is null. For example, a key "personal address book" is a key existing only in the setting information of the target "individual person" (an address book is described below). To the contrary, a "shared address book" is a key existing only for the target "shared use". In the example in FIG. 3, a personal address book of the personal user C is null, but there is the shared setting information. Thus the personal user C can refer to a shared address 1, a shared address 2, and a shared address 3 in the shared address book.

The setting value control unit 203 reads a personal setting value in the setting DB 400 at the time of login and reflects the read value to each setting information of the MFP 101. Thus, an operator can uses the MFP 101 of which settings are customized according to the personal setting information that the operator registered by himself or herself. Further, the setting value control unit 203 reads the setting value (shared setting value) of the shared setting information in the setting DB 400 at the time of logout and reflects the read value to each setting information of the MFP 101. Thus, a function which can be used in the non-login state can be used in the shared setting value.

As an example of the personal setting, the display language setting is described with reference to FIG. 4. The setting information pieces shown in FIG. 3 are stored in the setting DB 400. FIG. 4 illustrates a state when a user A logs in to the MFP 101, and a screen shifts from a login screen 411 to a main menu screen 412 after the login. As illustrated in FIG. 3, regarding the display language setting of the shared setting, the key "display language" of the target "shared use" has the setting value "English". Whereas, regarding the display language setting of the user A, the key "display language" of the target "user A" has the setting value "Japanese".

The login screen 411 is a screen displayed in the non-login state. Thus, on the login screen 411, the shared setting information is used, and characters on the login screen 411 are displayed in "English" according to the setting value of the display language.

The main menu screen 412 is a screen displayed after the login processing is successful and a state is shifted from the non-login state to the login state. Thus, on the main menu screen 412, the personal setting information of the user A is used, and characters on the main menu screen 412 are displayed in "Japanese" according to the setting value of the display language.

The setting items in FIG. 3 are examples. The setting items may include a keyboard setting, an accessibility setting, and functions to be displayed after the login in addition to the above-described setting items, and these setting items can be customized as the personal setting. The personal setting information may further include personal data of each function, such as an address book of each individual person. Needless to say, the personal setting information may include settings of each personal user of the MFP 101 other than those described above.

FIGS. 5A to 5D are tables in a data configuration of the management table DB 500. The management table DB 500 includes an upper limit table 501, a personal management table 502, a group management table 503, and a deletion management table 504. As shown in FIG. 5A, the upper limit table 501 stores a maximum number of personal users, a maximum number of group users, a maximum data size of a single personal user, a maximum data size of a single group user, and an entire storage capacity therein. The maximum number of personal users and the maximum number of group users are respectively the number of the personal setting information pieces and the number of the group setting information pieces which can be registered in the setting DB 400. Further, the maximum data size of a single personal user and the maximum data size of a single group user are respectively maximum sizes of data which can be recorded as the setting information of a single personal user and a single group user. The entire storage capacity is a size of an entire storage capacity for storing the setting information. Each value in the upper limit table 501 is determined in advance.

In the upper limit table 501 shown in FIG. 5A, the maximum number of personal users is set to 5, the maximum number of group users is set to 3, the maximum data size of a single personal user is set to 1 MB, the maximum data size of a single group user is set to 2 MB, and the entire storage capacity is set to 10 MB.

As shown in FIG. 5B, the personal management table 502 stores the number of registered personal users. The number of registered personal users is the number of the personal users whose setting information pieces are registered in the setting DB 400. The personal management table 502 further stores a personal identifier of the registered personal user, the storage capacity size actually being used, and a time and date of last use of the setting value in the personal setting information corresponding to the personal user in association with each other. Each information in the personal management table 502 is managed by the setting value control unit 203. In other words, the setting value control unit 203 performs registration, update, and deletion of each information in the personal management table 502.

In the personal management table 502 shown in FIG. 5B, the number of registered personal users is set to 5, a used capacity of the user A is set to 50 KB, and the time and date of last use is set to Nov. 7, 2013. In the personal management table 502, the used capacity and the time and date of last use are similarly set to each of the users B, C, D, and E.

As shown in FIG. 5C, the group management table 503 stores the number of registered group users. The number of registered group users is the number of group users, namely the number of groups of which setting information pieces are registered in the setting DB 400. The group management table 503 further stores a group identifier of the registered group user, the storage capacity size actually being used, and a time and date of last use of the setting value in the group setting information corresponding to the group user in association with each other. Each information in the group management table 503 is managed by the setting value control unit 203. In other words, the setting value control unit 203 performs registration, update, and deletion of each information in the group management table 503.

In the group management table 503 shown in FIG. 5C, the number of registered group users is set to 2, a used capacity of the group 1 is set to 470 KB, and the time and date of last use is set to Nov. 7, 2013.

As shown in FIG. 5D, the deletion management table 504 stores a used storage capacity, automatic deletion of person, and automatic deletion of group therein. The used storage capacity is a total size of the storage capacities which are being used by each personal user and each group user to store the setting information pieces. The automatic deletion of person is information indicating ON and OFF of an automatic deletion function of the personal setting information. The automatic deletion of group is information indicating ON and OFF of an automatic deletion function of the group setting information. In the deletion management table 504 shown in FIG. 5D, the used storage capacity is set to 8 MB, and both of the automatic deletion of person and the automatic deletion of group are set to ON.

The automatic deletion is described below. There are upper limits of the number of personal users and the number of group users of which setting information pieces can be managed in the MFP 101. More specifically, in the upper limit table 501 in FIG. 5A, the maximum number of personal users and the maximum number of group users are set as the upper limits of the number of personal users and the number of group users. Thus, when personal users and group users exceeding the upper limits try to register setting information, processing causes an error, and a new user cannot register setting information.

In this regard, the MFP 101 according to the present exemplary embodiment has the automatic deletion function of automatically deleting the setting information stored in the setting DB 400. The automatic deletion function is a function that the setting value control unit 203 automatically deletes the setting information stored in the setting DB 400. The setting value control unit 203 deletes the setting information not in units of setting values but in unit of users, namely units of setting information. This is because, a plurality of setting values corresponding to individual functions may be operated in conjunction with each other, and in such a case, if the setting information is deleted in units of setting values, it may cause an incomplete state, such as a setting value of an associated destination does not exist.

Further, the setting value control unit 203 automatically deletes the setting information of which time and date of last use is old at a timing when the non-login state is shifted to the login state. Accordingly, when a new user logs in, the MFP 101 can secure a free space having a size sufficient to register setting information of the new user therein without troubling an administrator in a situation in which the number of the registered setting information pieces has reached the upper limit.

The setting value control unit 203 not only deletes the oldest personal setting information or the oldest group setting information, but also repeats the processing for deleting the oldest personal setting information or the like until a free space for a new registration size is secured in the setting DB 400. The new registration size is a free space in the setting DB 400 as a storage unit which is necessary for registration of setting information of a new user (operator) whose setting information is not registered in the setting DB 400. According to the present exemplary embodiment, the maximum data size of a single personal user or a single group user is regarded as the new registration size. In addition, the setting value control unit 203 executes the automatic deletion function only when the automatic deletion is set to ON in the deletion management table 504 shown in FIG. 5D.

A case when each information shown in FIGS. 5A to 5D is stored in the management table DB 500 is described in detail below as an example. In the upper limit table 501 shown in FIG. 5A, the maximum number of personal users is set to 5, and in the personal management table 502 shown in FIG. 5B, the number of registered personal users is set to 5. Thus, the number of personal users who can register the personal setting information has already reached the upper limit. Further, in the deletion management table 504 shown in FIG. 5D, the automatic deletion of person is set to ON.

Therefore, if a new user logs in to the MFP 101 in this state, the setting value control unit 203 refers to the personal management table 502 in FIG. 5B to specify the personal user whose time and date of last use is the oldest. Then, the setting value control unit 203 deletes a record (the personal identifier, the used capacity, and the time and date of last use) of the specified personal user from the personal management table 502 and further deletes the personal setting information of the specified personal user from the setting DB 400.

More specifically, the setting value control unit 203 first deletes a record and the personal setting information corresponding to the user C whose time and date of last use is the oldest. The used capacity of the user C in the setting DB 400 is 130 KB, which is less than 1 MB. Thus, the setting value control unit 203 further deletes a record and the personal setting information corresponding to the user B whose time and date of last use is the next oldest to the user C. Accordingly, a deleted data size becomes 130 KB+1 MB (1024 KB)=1154 KB, which is greater than the maximum data size of a single personal user 1 MB (1024 KB).

As described above, when a new user logs in to the MFP 101, the setting value control unit 203 deletes the setting information pieces of a plurality of users until a free space corresponding to the maximum data size of a single personal user can be secured. Deletion of a plurality of personal users is described above, and the same applies to the group users.

During the login, high load processing (a job), like copy processing, is often executed. However, the MFP 101 according to the present exemplary embodiment has already completed the deletion processing of the setting information when shifting to the login state, so that the deletion of the setting information is not executed during the login. Therefore, performance of operations during the login can be prevented from deteriorating.

The MFP 101 also executes the automatic deletion when running out of a capacity for storing the setting information in the setting DB 400. More specifically, the MFP 101 regards a value obtained by subtracting the maximum data size of a single personal user or the maximum data size of a single group user from the entire storage capacity in FIG. 5A as a used capacity threshold value. Then, the MFP 101 executes the automatic deletion when the used storage capacity in the deletion management table 504 in FIG. 5D is equal to or greater than the used capacity threshold value. In other words, the MFP 101 executes the automatic deletion when the free space in the setting DB 400 is less than a free space threshold value.

In the example in FIGS. 5A to 5D, the entire storage capacity is 10 MB, and the maximum data size of a single personal user and the maximum data size of a single group user are respectively 1 MB and 2 MB. Therefore, the used capacity threshold value is 7 MB (=10 MB−1 MB−2 MB). The used capacity threshold value is not limited to the one described in the present exemplary embodiment. The automatic deletion in response to a comparison result with the capacity threshold value is also executed only on a target of which automatic deletion of person and automatic deletion of group are ON in the deletion management table 504.

Figure 6A:
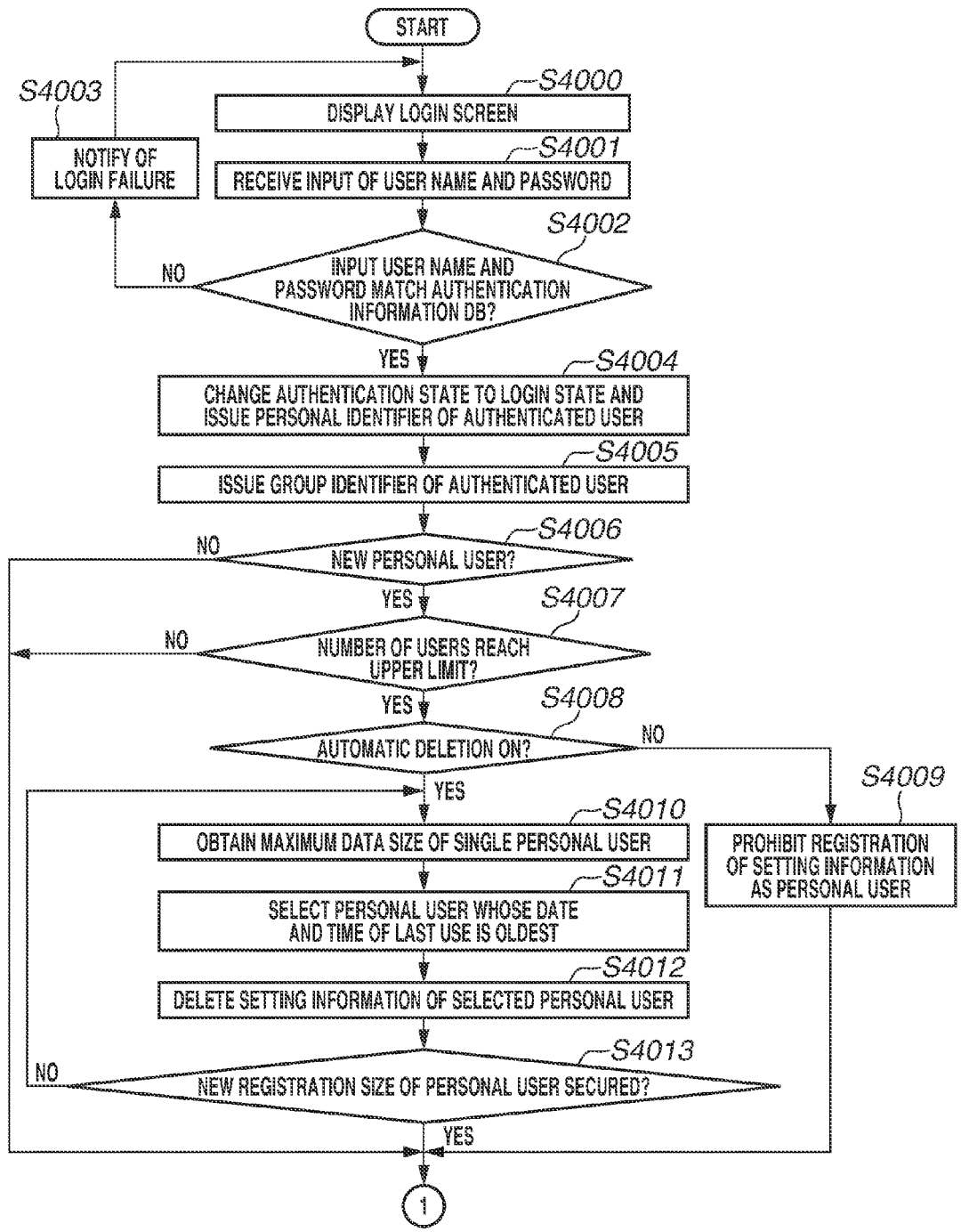
FIG. 6A is a flowchart illustrating login processing.

FIGS. 6A and 6B are flowcharts illustrating login processing. The authentication control unit 202 starts the login processing when an operator instructs login. As described above, processing by the authentication control unit 202 is executed when a program stored in the ROM 113 is controlled by the CPU 111. The authentication control unit 202 transmits a request to each control unit to execute processing in the following flowcharts. A case when the MFP 101 executes authentication is described below, however the authentication may be executed by an external server.

Figure 7:
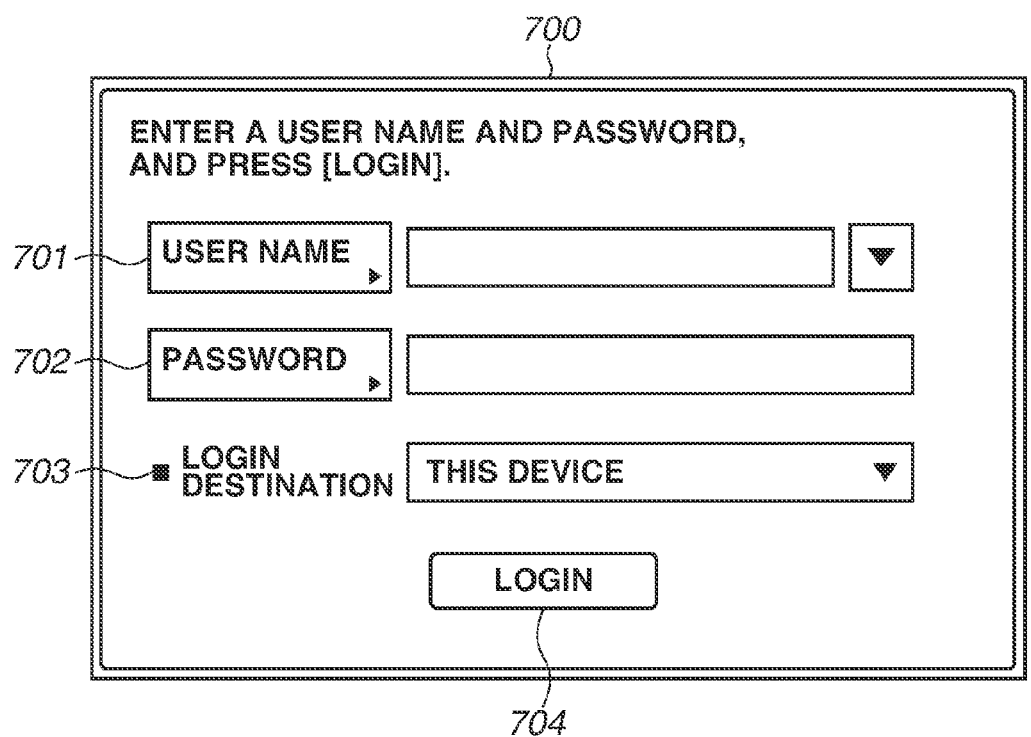
FIG. 7 illustrates an example of a login screen.

In step S4000, the display operation control unit 201 displays a login screen 700 on the display 119. FIG. 7 illustrates an example of the login screen 700. The login screen 700 includes a user name input form 701, a password input form 702, a login destination selection button 703, and a login button 704. An operator inputs a user name to the user name input form 701 and a password corresponding to the password input form 702. The login destination selection button 703 is used to select an authentication destination. When the authentication is executed based on the authentication information DB 320 in the MFP 101, "This device" is selected as illustrated in FIG. 7. When the external authentication server executes authentication, an operator selects a name of the external authentication server in the login destination selection button 703, and the selected authentication server executes the authentication.

Returning to FIG. 6A, in step S4001, when an operator executes input processing using the touch panel 118, the display operation control unit 201 receives a user name from the user name input form 701 and a password from the password input form 702 via the display control I/F 115. The authentication control unit 202 receives the user name and the password input in step S4001 from the display operation control unit 201, and in step S4002, collates whether the received user name and password match with the user name and the password in the authentication information DB 320.

In the case that the external authentication server executes the authentication, in step S4002, the authentication control unit 202 performs encryption or obfuscation on the input user name and password via the communication I/F controller 117. Then, the authentication control unit 202 requests the external authentication server to authenticate the encrypted or obfuscated information and receives an authentication result therefrom.

In step S4002, if collated information does not match with each other (NO in step S4002), the authentication control unit 202 advances the processing to step S4003. In step S4003, the authentication control unit 202 determines that the login failed, notifies the operator of login failure via the display operation control unit 201, and then advances the processing to login reception processing in step S4000.

In step S4002, if collated information matches with each other (YES in step S4002), the authentication control unit 202 determines that the authentication is successful, in other words, the operator is a legitimate user, and advances the processing to step S4004. In step S4004, the authentication control unit 202 changes an authentication state from the non-login state to the login state and issues a personal identifier for uniquely specifying the operator. The processing in step S4004 is an example of state management processing for shifting the authentication information from the non-login state to the login state when the operator is the legitimate user. Next, in step S4005, the authentication control unit 202 issues a group identifier of a group to which the personal identifier issued in step S4004 belongs.

In step S4006, the setting value control unit 203 determines whether the operator is a new personal user. More specifically, if the personal identifier issued in step S4004 is not stored in the personal management table 502 of the management table DB 500 (see FIG. 5B), the setting value control unit 203 determines that the operator is a new personal user. If it is determined that the operator is a new personal user (YES in step S4006), the setting value control unit 203 advances the processing to step S4007. If it is determined that the operator is not a new personal user (NO in step S4006), the setting value control unit 203 advances the processing to step S4014. The processing in step S4006 is an example of registration confirmation processing for determining whether the personal setting information of the operator is registered in the setting DB 400 as the storage unit.

In step S4007, the setting value control unit 203 determines whether the number of registered personal users in the personal management table 502 of the management table DB 500 has reached the upper limit (a personal threshold value). The upper limit is the maximum number of personal users in the upper limit table 501 of the management table DB 500 (see FIG. 5A). In other words, when the number of registered personal users in the personal management table 502 matches with the maximum number of personal users in the upper limit table 501, namely is the personal threshold value or greater, the setting value control unit 203 determines that the number of registered personal users has reached the upper limit. If it is determined that the number of registered personal users has reached the upper limit (YES in step S4007), the setting value control unit 203 advances the processing to step S4008. If it is determined that the number of registered personal users has not reached the upper limit (NO in step S4007), the setting value control unit 203 advances the processing to step S4014.

In step S4008, the setting value control unit 203 determines whether the automatic deletion of person is ON in the deletion management table 504 of the management table DB 500 (see FIG. 5D). If the automatic deletion of person is ON (YES in step S4008), the setting value control unit 203 advances the processing to step S4010. If the automatic deletion of person is OFF (NO in step S4008), the setting value control unit 203 advances the processing to step S4009. In step S4009, the setting value control unit 203 prohibits registration of the personal setting information regarding the personal identifier obtained in step S4004. More specifically, the setting value control unit 203 sets "non-storable" in a personal setting storage flag (not illustrated) indicating prohibition of storage of the personal setting information and advances the processing to step S4014. The personal setting storage flag is set to "storable" as a default value. In the case that an application or the like stores the personal setting information, and "non-storable" is set to the personal setting storage flag, the setting value control unit 203 returns an error.

In step S4010, the setting value control unit 203 obtains the maximum data size that a single personal user can store from the upper limit table 501 (see FIG. 5A). Next, in step S4011, the setting value control unit 203 specifies the personal identifier of which time and date of last use is the oldest in the personal management table 502 and selects the personal user corresponding to the personal identifier. Next, in step S4012, the setting value control unit 203 deletes a record corresponding to the personal identifier selected in step S4011 from the personal management table 502 and deletes the personal setting information corresponding to the selected personal identifier from the setting DB 400. Further, the setting value control unit 203 updates the used storage capacity in the deletion management table 504 of the management table DB 500 according to a data size of the deleted personal setting information.

Next, in step S4013, the setting value control unit 203 determines whether a new registration size of the personal user is secured. The new registration size is the maximum data size of a single personal user. More specifically, the setting value control unit 203 compares the maximum data size of a single personal user in the upper limit table 501 with a value (free space) obtained by subtracting the used storage capacity in the deletion management table 504 (see FIG. 5D) from the entire storage capacity in the upper limit table 501 (see FIG. 5A). If a free space is equal to or greater than the maximum data size of a single personal user, the setting value control unit 203 determines that the new registration size is secured.

If the new registration size is secured (YES in step S4013), the setting value control unit 203 advances the processing to step S4014. If the new registration size is not secured (NO in step S4013), the setting value control unit 203 advances the processing to step S4010 to repeat the deletion processing. The processing in steps S4010 to S4013 is an example of data management processing for deleting one or more personal setting information pieces registered in the setting DB 400 as the storage unit and securing a new registration size necessary for registration of the personal setting information of the operator.

In step S4014, the setting value control unit 203 determines whether the operator is a new group user. More specifically, if the group identifier issued in step S4005 is not stored in the group management table 503 of the management table DB 500 (see FIG. 5C), the setting value control unit 203 determines that the operator is a new group user. If it is determined that the operator is a new group user (YES in step S4014), the setting value control unit 203 advances the processing to step S4015.

If it is determined that the operator is not a new group user (NO in step S4014), the setting value control unit 203 advances the processing to step S4022. The processing in step S4014 is an example of registration confirmation processing for determining whether the group setting information of the operator is registered in the setting DB 400 as the storage unit.

In step S4015, the setting value control unit 203 determines whether the number of registered group users in the group management table 503 of the management table DB 500 has reached the upper limit (a group threshold value). The upper limit is the maximum number of group users in the upper limit table 501 of the management table DB 500 (see FIG. 5A). In other words, when the number of registered group users in the group management table 503 matches with the maximum number of group users in the upper limit table 501, namely is the group threshold value or greater, the setting value control unit 203 determines that the number of registered group users has reached the upper limit.

If it is determined that the number of registered group users has reached the upper limit (YES in step S4015), the setting value control unit 203 advances the processing to step S4016. If it is determined that the number of registered group users has not reached the upper limit (NO in step S4015), the setting value control unit 203 advances the processing to step S4022.

In step S4016, the setting value control unit 203 determines whether the automatic deletion of group is ON in the deletion management table 504 of the management table DB 500 (see FIG. 5D). If the automatic deletion of group is ON (YES in step S4016), the setting value control unit 203 advances the processing to step S4018. If the automatic deletion of group is OFF (NO in step S4016), the setting value control unit 203 advances the processing to step S4017. In step S4017, the setting value control unit 203 prohibits registration of the group setting information regarding the group identifier obtained in step S4005. More specifically, the setting value control unit 203 sets "non-storable" in a group setting storage flag (not illustrated) indicating prohibition of storage of the group setting information and advances the processing to step S4022. The group setting storage flag is set to "storable" as a default value. In the case that an application or the like stores the group setting information, and "non-storable" is set to the group setting storage flag, the setting value control unit 203 returns an error.

In step S4018, the setting value control unit 203 obtains the maximum data size that a single group can store from the upper limit table 501 (see FIG. 5A). Next, in step S4019, the setting value control unit 203 specifies the oldest time and date of last use in the group management table 503 and selects the group user corresponding to the specified data. Next, in step S4020, the setting value control unit 203 deletes a record corresponding to the group identifier selected in step S4019 from the group management table 503 and deletes the group setting information corresponding to the selected group identifier from the setting DB 400. Further, the setting value control unit 203 updates the used storage capacity in the deletion management table 504 of the management table DB 500 according to a data size of the deleted group setting information.

Next, in step S4021, the setting value control unit 203 determines whether a new registration size of the group user is secured. The new registration size is the maximum data size of a single group user. More specifically, the setting value control unit 203 compares the maximum data size of a single group user in the upper limit table 501 with a value (free space) obtained by subtracting the used storage capacity in the deletion management table 504 (see FIG. 5D) from the entire storage capacity in the upper limit table 501 (see FIG. 5A). If a free space is equal to or greater than the maximum data size of a single group user, the setting value control unit 203 determines that the new registration size is secured.

If the new registration size is secured (YES in step S4021), the setting value control unit 203 advances the processing to step S4022. If the new registration size is not secured (NO in step S4021), the setting value control unit 203 advances the processing to step S4018 to repeat the deletion processing. The processing in steps S4018 to S4021 is an example of data management processing for deleting one or more group setting information pieces registered in the setting DB 400 as the storage unit and securing a new registration size necessary for registration of the group setting information of the operator.

In step S4022, the setting value control unit 203 compares the used storage capacity in the deletion management table 504 with the used capacity threshold value. If the used storage capacity is equal to or greater than the used capacity threshold value (YES in step S4022), the setting value control unit 203 advances the processing to step S4023. If the used storage capacity is less than the used capacity threshold value (NO in step S4022), the setting value control unit 203 advances the processing to step S4028. In step S4023, the setting value control unit 203 determines whether the automatic deletion of person or the automatic deletion of group is ON. If at least one of the automatic deletion of person and the automatic deletion of group is set to ON (YES in step S4023), the setting value control unit 203 advances the processing to step S4025. If both of the automatic deletion of person and the automatic deletion of group are OFF (NO in step S4023), the setting value control unit 203 advances the processing to step S4024.

In step S4024, the setting value control unit 203 sets the personal setting storage flag and the group setting storage flag, which are not illustrated, to "non-storable" regarding the personal identifier obtained in step S4004 and the group identifier obtained in step S4005. Accordingly, the operator falls into a state in which the operator cannot register the personal setting information and the group setting information. Then, the setting value control unit 203 advances the processing to step S4028.

In step S4025, the setting value control unit 203 select the personal identifier or the group identifier of which time and date of last use is the oldest based on the automatic deletion of person or the automatic deletion of group determined in step S4023. More specifically, if both of the automatic deletion of person and the automatic deletion of group are set ON, the setting value control unit 203 refers to both of the personal management table 502 (see FIG. 5B) and the group management table 503 (see FIG. 5C). Then, the setting value control unit 203 selects the personal identifier or the group identifier associated with the oldest time and date of last use among these tables.

Further, if only the automatic deletion of person is set to ON, the setting value control unit 203 refers to the personal management table 502 and selects the personal identifier associated with the oldest time and date of last use therein. Similarly, if only the automatic deletion of group is set to ON, the setting value control unit 203 refers to the group management table 503 and selects the group identifier associated with the oldest time and date of last use therein.

In step S4026, the setting value control unit 203 deletes a record corresponding to the personal identifier or the group identifier selected in step S4025 and further deletes the setting information corresponding to the selected personal identifier or group identifier. More specifically, when selecting the personal identifier in step S4025, the setting value control unit 203 deletes a record corresponding to the selected personal identifier from the personal management table 502. The setting value control unit 203 further deletes the personal setting information corresponding to the selected personal identifier from the setting DB 400.

Whereas, when selecting the group identifier in step S4025, the setting value control unit 203 deletes a record corresponding to the selected group identifier from the group management table 503. The setting value control unit 203 further deletes the group setting information corresponding to the selected group identifier from the setting DB 400. Furthermore, the setting value control unit 203 updates the used storage capacity in the deletion management table 504 of the management table DB 500 according to a data size of the deleted personal setting information or group setting information.

In step S4027, the setting value control unit 203 determines whether the used storage capacity is equal to or greater than the used capacity threshold value. If the used storage capacity is equal to or greater than the used capacity threshold value (YES in step S4027), there is no sufficient free space to register new setting information in the setting DB 400, so that the setting value control unit 203 advances the processing to step S4025 to repeat the deletion processing. If the used storage capacity is less than the used capacity threshold value (NO in step S4027), the setting value control unit 203 advances the processing to step S4028. The processing in steps S4022 to S4027 is an example of data management processing for deleting one or more setting information pieces if a free space in the setting DB 400 as the storage unit is less than a threshold value and securing a new registration size necessary for registration of the setting information of the operator.

In step S4028, the authentication control unit 202 executes reflection processing of the personal setting. Next, in step S4029, the authentication control unit 202 notifies the operator of success of login via the display operation control unit 201 and completes the login processing. The authentication method is not limited to the above-described one, and other authentication methods, such as a method using a non-contact type integrated circuit (IC) card, can be used.

Figure 8:
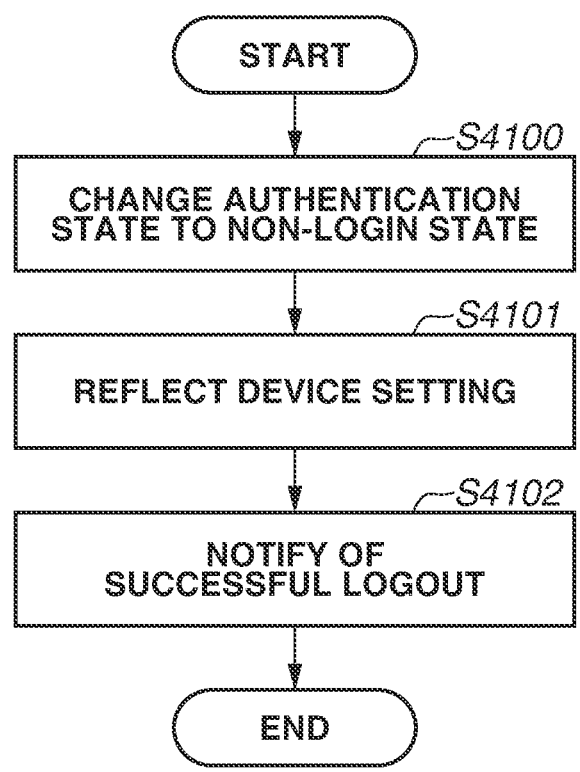
FIG. 8 is a flowchart illustrating logout processing.

FIG. 8 is a flowchart illustrating logout processing. In step S4100, if a logout request from a user is received via the touch panel 118, the display operation control unit 201 changes the authentication state from the login state to the non-login state. In step S4101, the authentication control unit 202 executes reflection processing of settings. In step S4102, the authentication control unit 202 notifies the user of success of logout via the display operation control unit 201 and completes the logout processing.

As described above, if the number of registerable personal users or the number of registerable group users reaches the upper limit, the MFP 101 according to the present exemplary embodiment automatically deletes data in the setting DB 400 when an operator logs in to the MFP. Thus, the MFP 101 can secure the storage capacity for registering setting information of a new user. A data size to be deleted is a size sufficient to register setting information of a single user. Thus, if the data deletion processing is executed after the login, then data is not deleted. Therefore, performance of job execution during the login can be prevented from deteriorating. Further, since the MFP 101 separately performs data deletion on each of the personal setting information and the group setting information, if the number of the registered group setting information exceeds the upper limit, the personal setting information is not deleted.

As for a modified example of the MFP 101 according to the first exemplary embodiment, upper limits of the number of personal users and the number of group users which can be registered in the setting DB 400 are not limited to the above-described exemplary embodiment. The upper limit may be, for example, a predetermined fixed value or a value obtained by multiplying the maximum number of personal users or the maximum number of group users by a certain reduction rate.

As for a second modified example, in step S4022 shown in FIG. 6B, a memory size to be secured when it is determined that the used storage capacity is equal to or greater than the used capacity threshold value is not limited to the above-described exemplary embodiment. For example, if an operator is a registered personal user (NO in step S4006 and NO in step S4014), the MFP 101 calculates a difference between the maximum data size of a single personal user and a data size already used. Then, the MFP 101 may set the calculated difference as a memory size to be secured. As described above, if a free space in the setting DB 400 as the storage unit is less than a threshold value, the MFP 101 can secure a free space equal to or greater than the threshold value at a timing when the state is shifted from the non-login state to the login state.

Figure 9:
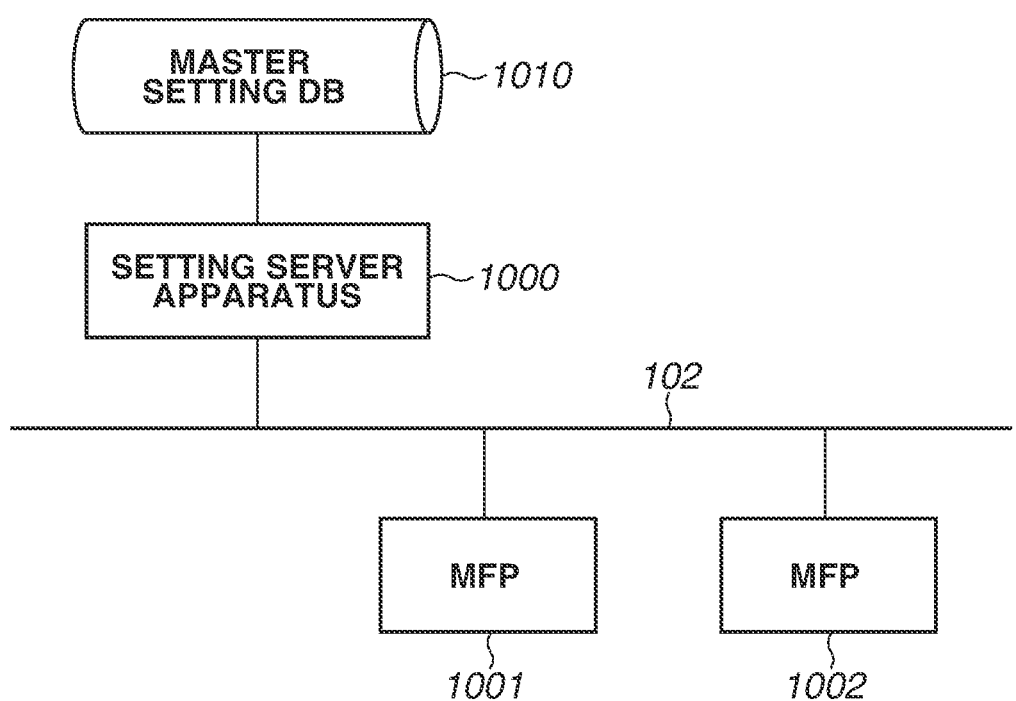
FIG. 9 illustrates an image forming system.

FIG. 9 illustrates an image forming system according to a second exemplary embodiment. The image forming system includes a setting server apparatus 1000, two MFPs 1001 and 1002, and a master setting DB 1010. In the image forming system according to the second exemplary embodiment, a plurality of MFPs 1001 and 1002 manages personal setting information and group setting information in synchronization with each other.

A configuration of the image forming system illustrated in FIG. 9 is an example, so that the image forming system may include other components or have a different configuration which can provide effects similar to the configuration in FIG. 9. The MFP 1001 or the MFP 1002 may include a configuration of the setting server apparatus 1000. The master setting DB 1010 stores shared setting information, personal setting information, and group setting information. The setting server apparatus 1000 manages the master setting DB 1010.

As illustrated in FIG. 9, the MFP 1001 and the MFP 1002 are connected to the setting server apparatus 1000 via the network 102. When a user changes the setting information at the MFP 1001, the setting server apparatus 1000 is notified of the changed content. On the other hand, the MFP 1002 makes an inquiry to the setting server apparatus 1000 as to whether setting is changed, and if there is any setting change, the MFP 1002 receives the setting information from the setting server apparatus 1000. Accordingly, the content of the setting change in the MFP 1001 is reflected to the MFP 1002.

Hardware configurations of the MFP 1001 and the MFP 1002 are similar to that of the MFP 101 according to the first exemplary embodiment. Regarding software configurations and processing of the MFP 1001 and the MFP 1002, points different from those of the MFP 101 according to the first exemplary embodiment are described below.

Figure 10:
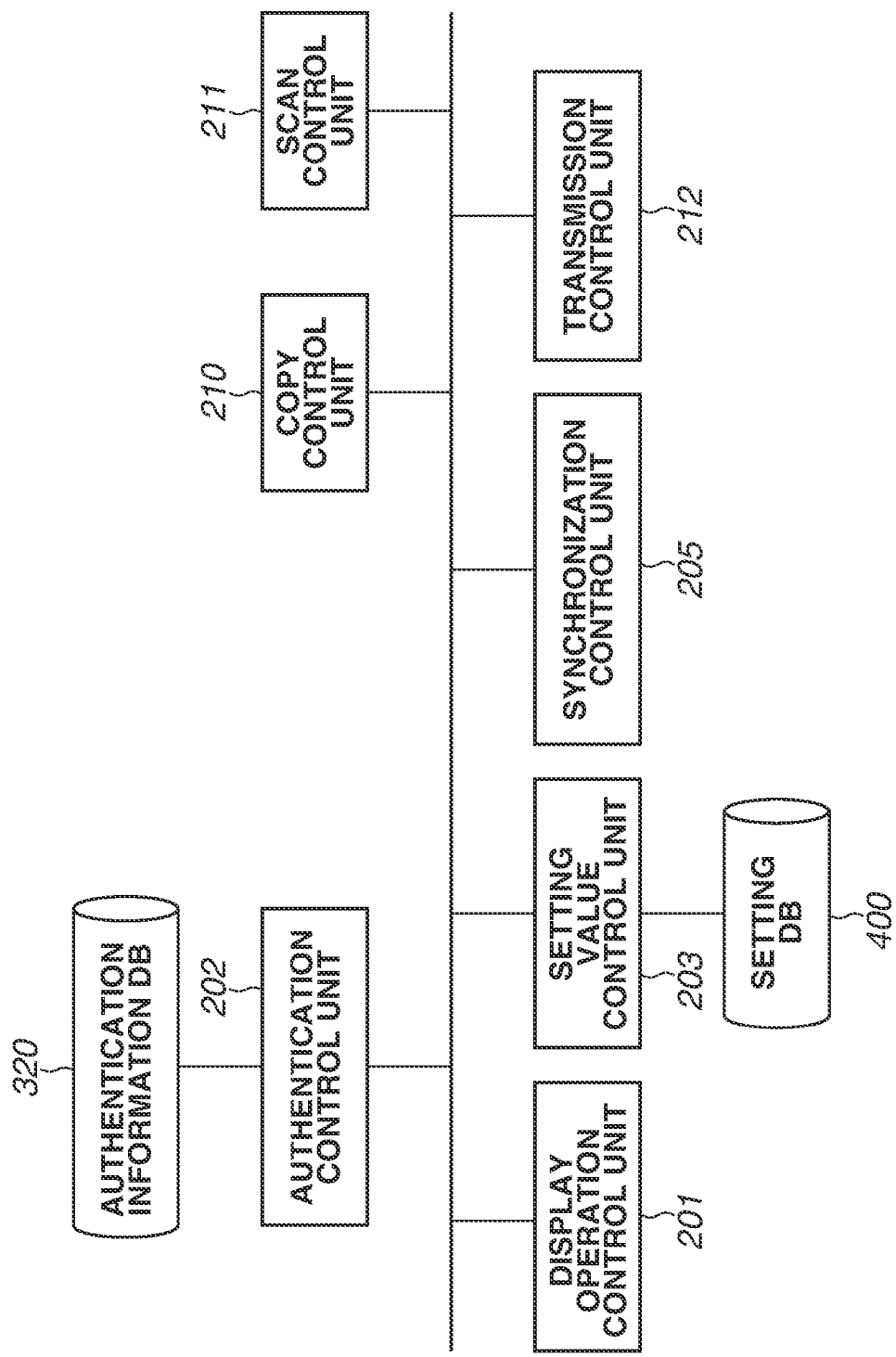
FIG. 10 illustrates an example of a software configuration of an MFP according to a second exemplary embodiment.

FIG. 10 illustrates the software configuration of the MFPs 1001 and 1002 according to the second exemplary embodiment. The MFPs 1001 and 1002 according to the second exemplary embodiment include a synchronization control unit 205 in addition to the software configuration of the MFP 101 according to the first exemplary embodiment. The synchronization control unit 205 communicates with the setting server apparatus 1000 via the communication I/F controller 117. The synchronization control unit 205 performs control to synchronize a setting value stored in the setting DB 400 with a setting value stored in the master setting DB 1010 on the setting server apparatus 1000.

The MFPs 1001 and 1002 execute login processing (see FIGS. 6A and 6B) similar to the MFP 101 according to the first exemplary embodiment. More specifically, if at least one of the automatic deletion of person and the automatic deletion of group is set to ON, the MFPs 1001 and 1002 execute the automatic deletion processing of the setting information at a timing when the state is shifted from the non-login state to the login state.

Figure 11:
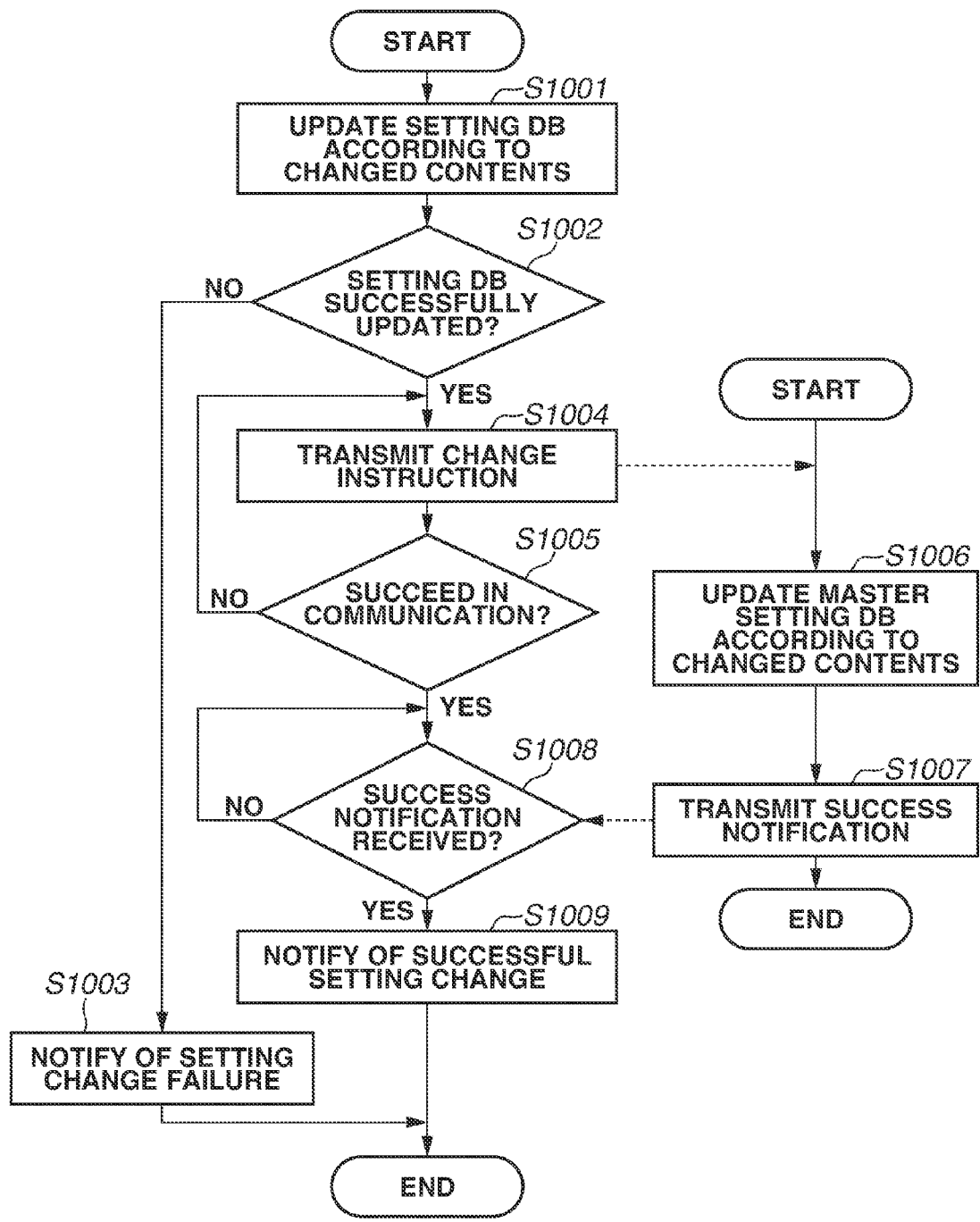
FIG. 11 is a sequence diagram illustrating master setting DB update processing.

FIG. 11 is a sequence diagram illustrating master setting DB update processing by the image forming system. In the master setting DB update processing, if the setting information in the setting DB 400 is changed (registered, updated, or deleted), the MFP 1001 notifies the setting server apparatus 1000 of a changed content. The setting server apparatus 1000 then changes the setting information in the master setting DB 1010 according to the changed content. Accordingly, the setting DB 400 in the MFP 1001 can be synchronized with the master setting DB 1010. The setting change is executed, in response to an instruction from an operator, by any of the function control units including the copy control unit 210, the scan control unit 211, the transmission control unit 212, and function units not illustrated.

In step S1001, when the changed content of the setting information is received from each function control unit, the setting value control unit 203 updates the setting DB 400 according to the changed content. In step S1002, if the setting change fails (NO in step S1002), the setting value control unit 203 advances the processing to step S1003. Then, in step S1003, each function control unit notifies the operator of a failure in the setting change. If the setting change is successful (YES in step S1002), the setting value control unit 203 requests the synchronization control unit 205 to notify the setting server apparatus 1000 of the content of the setting change. Then, in step S1004, the synchronization control unit 205 transmits a change instruction including the content of the setting change to the setting server apparatus 1000 via the network 102. The processing in step S1004 is an example of transmission processing for transmitting a change instruction.

In step S1005, if communication with the setting server apparatus 1000 is successful (YES in step S1005), the synchronization control unit 205 advances the processing to step S1008. If communication with the setting server apparatus 1000 fails (NO in step S1005), the synchronization control unit 205 advances the processing to step S1004 to retry the communication with the setting server apparatus 1000.

In step S1006, when the change instruction is received, the setting server apparatus 1000 updates the master setting DB 1010 according to the content of the setting change. Then, in step S1007, the setting server apparatus 1000 transmits to the MFP 1001 a success notification indicating that the master setting DB 1010 is successfully updated.

In step S1008, the MFP 1001 waits to receive the success notification. When the success notification is received (YES in step S1008), then in step S1009, each function control unit in the MFP 1001 notifies the operator of success of the setting change. Thus, setting change notification processing is completed.

Figure 12:
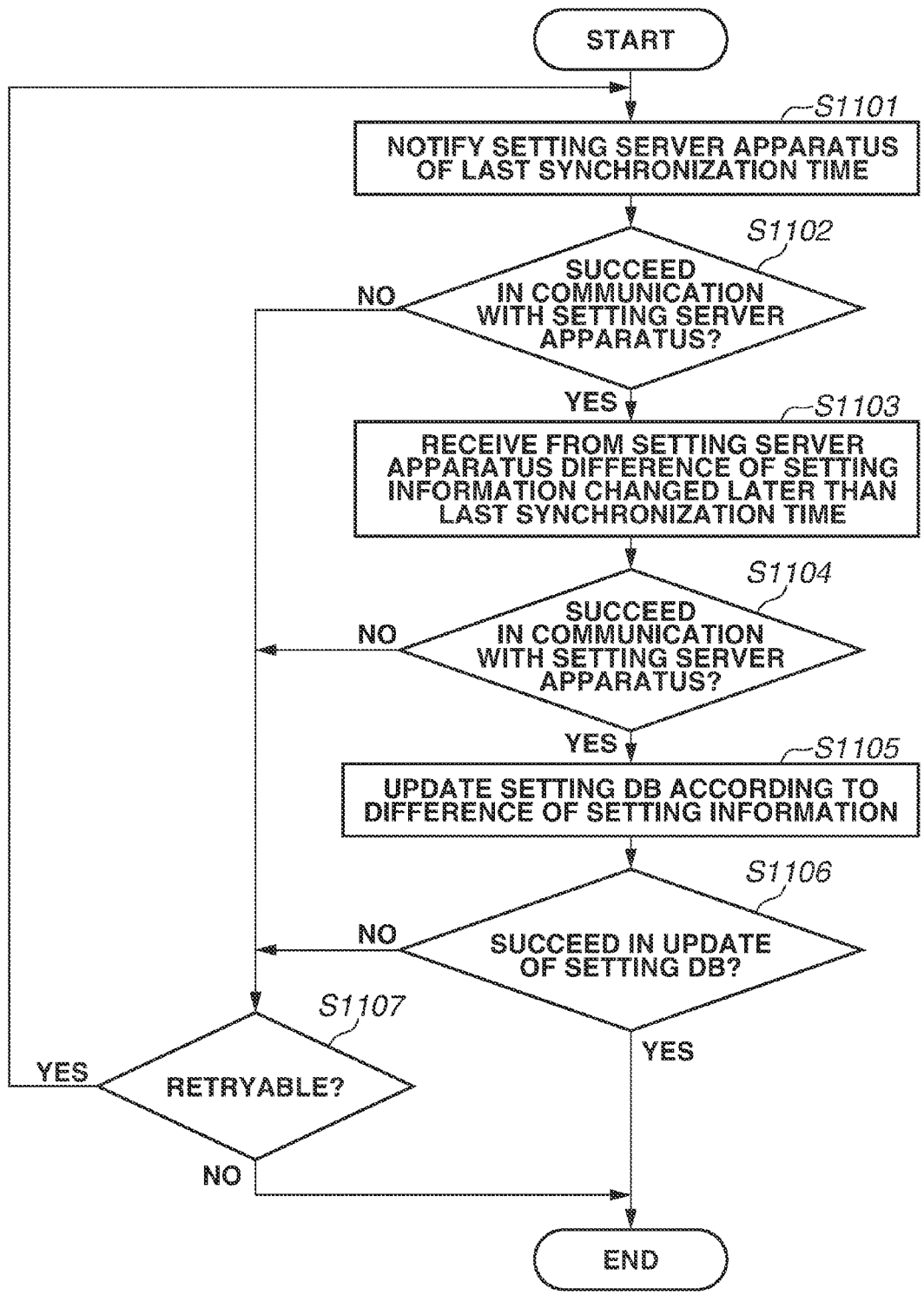
FIG. 12 is a flowchart illustrating setting DB update processing.

FIG. 12 is a flowchart illustrating setting DB update processing by the MFP 1002. The MFP 1002 executes the setting DB update processing when an operator logs in to and out from the MFP 1002. An execution timing of the setting DB update processing is not limited to the one in the present exemplary embodiment. The MFP 1002 may execute the setting DB update processing, for example, regularly. As for another example, the MFP 1002 may execute the setting DB update processing at a specified time which is set in advance.

A case is described as an example in which the setting DB 400 in the MFP 1002 is updated according to the master setting DB 1010 which is updated according to the change of the setting information in the MFP 1001. The setting value control unit 203 in the MFP 1002 transmits a request to start synchronization processing to the synchronization control unit 205. In step S1101, the synchronization control unit 205 transmits a last synchronization time to the setting server apparatus 1000 in response to synchronization request. In step S1102, if communication with the setting server apparatus 1000 fails (NO in step S1102), the synchronization control unit 205 advances the processing to step S1107. In step S1107, the synchronization control unit 205 determines whether the processing can be retried. If the processing can be retried (YES in step S1107), the synchronization control unit 205 advances the processing to step S1101. If the processing cannot be retried (NO in step S1107), the synchronization control unit 205 completes the setting DB update processing.

In step S1102, if it is determined that communication with the setting server apparatus 1000 in step S1101 is successful (YES in step S1102), the synchronization control unit 205 advances the processing to in step S1103. Then, in step S1103, the synchronization control unit 205 requests the setting server apparatus 1000 to transmit a difference of the setting information pieces between the one of the last synchronization time and the one changed after the last synchronization time.

In step S1104, if it is determined that communication with the setting server apparatus 1000 in step S1103 is successful (YES in step S1104), the synchronization control unit 205 receives the difference of the setting information from the setting server apparatus 1000. Then, in step S1105, the setting value control unit 203 updates the setting DB 400 based on the difference of the setting information. If it is determined that communication with the setting server apparatus 1000 in step S1103 fails (NO in step S1104), the synchronization control unit 205 advances the processing to step S1107.

In step S1106, if it is determined that reflection of the difference of the setting data to the setting DB 400 in step S1105 fails (NO in step S1106), the setting value control unit 203 advances the processing to step S1107. If it is determined that reflection of the difference of the setting data to the setting DB 400 in step S1105 is successful (YES in step S1106), the setting value control unit 203 completes the setting DB update processing.

The MFP 1002 may execute the setting DB update processing separately (at different timings) on each of the shared setting information, the personal setting information, and the group setting information. In addition, synchronization of only specific setting information may be started at a timing different from others.

As described above, the image forming system according to the present exemplary embodiment can share the setting information among a plurality of MFPs by utilizing the setting server apparatus 1000 provided outside the MFPs.

In the image forming system, the setting information stored in the master setting DB 1010 of the setting server apparatus 1000 and the setting information stored in the setting DB 400 of each MFP can be respectively regarded as master data and a cache. In other words, if the personal setting information or the group setting information in each MFP is deleted, when master data exists in the setting server apparatus 1000, each MFP can obtain the master data by the setting DB update processing (see FIG. 12).

On the other hand, if the master setting DB 1010 is updated in the master setting DB update processing in response to the automatic deletion in the MFP, the master data is also deleted. Thus, the MFP which does not execute the automatic deletion also becomes unable to use the setting information subjected to the automatic deletion.

The processing is described in detail below. As assumption, an operator A uses both of the MFP 1001 and the MFP 1002 in the configuration of the image forming system illustrated in FIG. 9. In the setting DB 400 in the MFP 1001, a time and date of use by the operator A is the oldest, and the number of personal users reaches the upper limit. The automatic deletion of person is set to ON in the MFP 1001. Further, the setting server apparatus 1000 stores the personal setting information of the operator A.

If a new operator X logs in to the MFP 1001 in this state, the personal setting information of the oldest operator A is deleted. When a change instruction in response to the deletion is transmitted to the setting server apparatus 1000, and the master setting DB 1010 is to be updated, the personal setting information of the operator A stored in the master setting DB 1010 is deleted.

In order to avoid such a situation, when an instruction associated with the setting server apparatus 1000 is issued to the synchronization control unit 205, the MFP according to the present exemplary embodiment causes the setting value control unit 203 to forcibly set the automatic deletion of person and the automatic deletion of group to ON. Further, the MFP does not allow the synchronization control unit 205 to change the settings of the automatic deletion of person and group until an instruction to dissolve the association with the setting server apparatus 1000 is issued.

Furthermore, in the case that deletion of the personal setting information and the group setting information are executed in step S4012, step S4020, and step S4026, which are described with reference to FIGS. 6A and 6B according to the first exemplary embodiment, the MFP does not executes the master setting DB update processing (FIG. 11). More specifically, if the automatic deletion processing of the setting information is executed to secure a new registration size, the setting value control unit 203 prohibits transmission of the change instruction of the setting information corresponding to the deletion to the setting server apparatus 1000 (update control processing).

As described above, when the MFP synchronizes the setting information with the setting server apparatus 1000 in the image forming system according to the present exemplary embodiment, the automatic deletion of the setting information is forcibly validated. Accordingly, if an administrator forgets to set the automatic deletion, the personal and the group setting information pieces can be efficiently managed. Further, the image forming system does not update the master setting DB 1010 in response to the deletion of the setting information by the automatic deletion processing in the MFP. Therefore, if setting information of a certain user is deleted in an MFP, the setting information of the certain user is not deleted in another MFP.

According to each of the above-described exemplary embodiments, data deletion processing can be executed to secure a storage capacity for registering setting information without deteriorating performance of other job execution.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. An image forming apparatus configured to communicate with a server apparatus storing setting information for a plurality of users who log into the image forming apparatus, the image forming apparatus comprising:
   a memory device that stores a set of instructions; and
   at least one processor that executes the instructions to:
   receive, from the server apparatus, setting information for an authenticated user authenticated by an authentication unit;
   display, on a display unit, an operation screen based on the received setting information;
   store, in a storage unit, the received setting information for the authenticated user; and
   replace, in a case where a storing state of the setting information in the storage unit is a predetermined state, setting information stored in the storage unit for a second authenticated user who logged into the image forming apparatus with setting information for a first authenticated user which is received from the server apparatus after the setting information for the second authenticated user is received.

2. The image forming apparatus according to claim 1, wherein the storage unit stores the setting information as a cache.

3. The image forming apparatus according to claim 1, wherein the setting information is setting information related to image formation.

4. The image forming apparatus according to claim 1, wherein the at least one processor further executes instructions to delete the setting information stored in the storage unit at a timing of authenticating the first user and secure a free space of a size greater than or equal to a size threshold in the storage unit.

5. The image forming apparatus according to claim 1, wherein the storage unit further stores a time and date of a last use of the image forming apparatus by the authenticated user in association with the setting information for the authenticated user, and wherein the set of instructions further includes an instruction to delete one or more pieces of the setting information in a chronological order of the time and date of the last use until a free space of a size greater than or equal to a size threshold is secured.

6. The image forming apparatus according to claim 1, wherein the at least one processor further executes the instructions to delete the setting information in units of users.

7. The image forming apparatus according to claim 1, wherein the storage unit regards an individual person and a group as a user and stores personal setting information and group setting information as the setting information, and wherein the at least one processor further executes the instructions to delete, in a case where a number of personal setting information pieces stored in the storage unit is greater than or equal to a threshold value for the personal setting information, the setting information to secure a new registration size necessary for newly storing the personal setting information.

8. The image forming apparatus according to claim 7, wherein the at least one processor further executes the instructions to delete the group setting information, in a case where a number of group setting information pieces registered in the storage unit is greater than or equal to a group threshold value for the group setting information, to secure a new registration size necessary for new registration of the group setting information.

9. The image forming apparatus according to claim 8, wherein the at least one processor further executes the instructions to delete the group setting information, in a case where the number of the group setting information pieces registered in the storage unit is greater than or equal to the group threshold value and an automatic deletion function is set to ON, to secure a new registration size for the group setting information, and prohibit, in a case where the automatic deletion function is set to OFF, new registration of the group setting information.

10. The image forming apparatus according to claim 1, wherein the at least one processor further executes the instructions to execute, in a case where an automatic deletion function is set to ON, deletion processing for deleting the setting information for a user who logged into the image forming apparatus in the past, and prohibit, in a case where the automatic deletion function is set to OFF, newly storing setting information in the storage unit.

11. The image forming apparatus according to claim 1, wherein the setting information is information indicating a display language displayed on the operation screen.

12. The image forming apparatus according to claim 1, wherein the setting information is information indicating an operation screen initially displayed after performing a log in.

13. The image forming apparatus according to claim 1, wherein the at least one processor further executes the instructions to, in a case where a size of a free space of the storage unit is below a size threshold, determine that the storing state of the setting information in the storage unit is the predetermined state.

14. The image forming apparatus according to claim 1, wherein the at least one processor further executes the instructions to:
select a user whose date and time of a last use of the image forming apparatus is the oldest, and
delete the setting information for the selected user from the storage unit.

15. The image forming apparatus according to claim 1, wherein the at least one processor further executes the instructions to set whether to enable a function to automatically delete setting information of a user who logged into the image forming apparatus in the past.

16. The image forming apparatus according to claim 1, wherein the at least one processor executes the instructions to:
replace, in a case where a number of users for whom setting information is stored in the storage unit has reached a predetermined number, setting information stored in the storage unit for the second authenticated user with setting information for the first authenticated user.

17. The image forming apparatus according to claim 1, wherein the at least one processor executes the instructions to:
replace, in a case where a data size of a free space for storing setting information for a user received from the server apparatus is less than a predetermined data size, setting information stored in the storage unit for the second authenticated user with setting information for the first authenticated user.

18. A method for managing data executed by an image forming apparatus, the method comprising:
receiving, from a server apparatus, setting information for a user authenticated by an authentication unit;
displaying an operation screen based on the setting information for the user;
storing the setting information for the user in a storage unit; and
replacing, in a case where a storing state of setting information of the storage unit is a predetermined state, setting information for a second user who logged into the image forming apparatus stored in the storage unit with setting information for a first user which is received from the server apparatus after the setting information for the second user is received.

19. A non-transitory storage medium storing computer executable instructions causing a computer to execute a method for managing data executed by an image forming apparatus, the method comprising:
receiving, from a server apparatus, setting information for a user authenticated by an authentication unit;
displaying an operation screen based on the setting information for the user;
storing the setting information for the user in a storage unit; and
replacing, in a case where a storing state of setting information of the storage unit is a predetermined state, setting information for a second user who logged into the image forming apparatus stored in the storage unit with setting information for a first user which is received from the server apparatus after the setting information for the second user is received.

20. An image forming apparatus configured to communicate with a server apparatus storing setting information for a plurality of users who log into the image forming apparatus, the image forming apparatus comprising:
a memory device that stores a set of instructions; and at least one processor that executes the instructions to:
receive, from the server apparatus, setting information for an authenticated user authenticated by an authentication unit;
display, on a display unit, an operation screen based on the received setting information; and
store, in a storage unit, the received setting information for the authenticated user,
wherein the at least one processor executes the instructions to, in a case where a storing state of the setting information in the storage unit is a predetermined state, store, in place of setting information stored in the storage unit for a second authenticated user who logged into the image forming apparatus, setting information for a first authenticated user which is received from the server apparatus after the setting information for the second authenticated user is received.

21. The image forming apparatus according to claim 20, wherein the at least one processor executes the instructions to:
store, in a case where a number of users for whom setting information is stored in the storage unit has reached a predetermined number, setting information for the first authenticated user in place of the setting information for the second authenticated user.

22. The image forming apparatus according to claim 20, wherein the at least one processor executes the instructions to:
store, in a case where a data size of a free space for storing setting information for a user received from the server apparatus is less than a predetermined data size, setting information for the first authenticated user in place of the setting information for the second authenticated user.

23. A method for managing data executed by an image forming apparatus, the method comprising:
receiving, from a server apparatus, setting information for an authenticated user authenticated by an authentication unit;
displaying, on a display unit, an operation screen based on the received setting information; and
storing, in a storage unit, the received setting information for the authenticated user,
wherein, in a case where a storing state of the setting information in the storage unit is a predetermined state, in place of setting information stored in the storage unit for a second authenticated user who logged into the image forming apparatus, setting information for a first authenticated user is stored, the setting information for the first authenticated user is received from the server apparatus after the setting information for the second authenticated user is received.

24. A non-transitory storage medium storing computer executable instructions causing a computer to execute a method for managing data executed by an image forming apparatus, the method comprising:
receiving, from a server apparatus, setting information for an authenticated user authenticated by an authentication unit;
displaying, on a display unit, an operation screen based on the received setting information; and
storing, in a storage unit, the received setting information for the authenticated user,
wherein, in a case where a storing state of the setting information in the storage unit is a predetermined state, in place of setting information stored in the storage unit for a second authenticated user who logged into the image forming apparatus, setting information for a first authenticated user is stored, the setting information for the first authenticated user is received from the server apparatus after the setting information for the second authenticated user is received.

* * * * *